Aug. 13, 1929.     C. V. BUDDENBROCK     1,724,449
SOIL TREATING DEVICE
Filed April 9, 1928     2 Sheets-Sheet 1

CHARLES V. BUDDENBROCK
INVENTOR
PER
Albert J. Fihe
ATTORNEY

Aug. 13, 1929.  C. V. BUDDENBROCK  1,724,449
SOIL TREATING DEVICE
Filed April 9, 1928  2 Sheets-Sheet 2
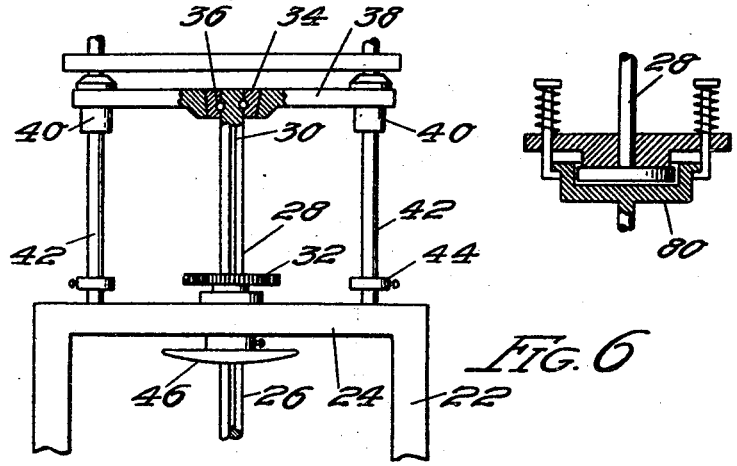
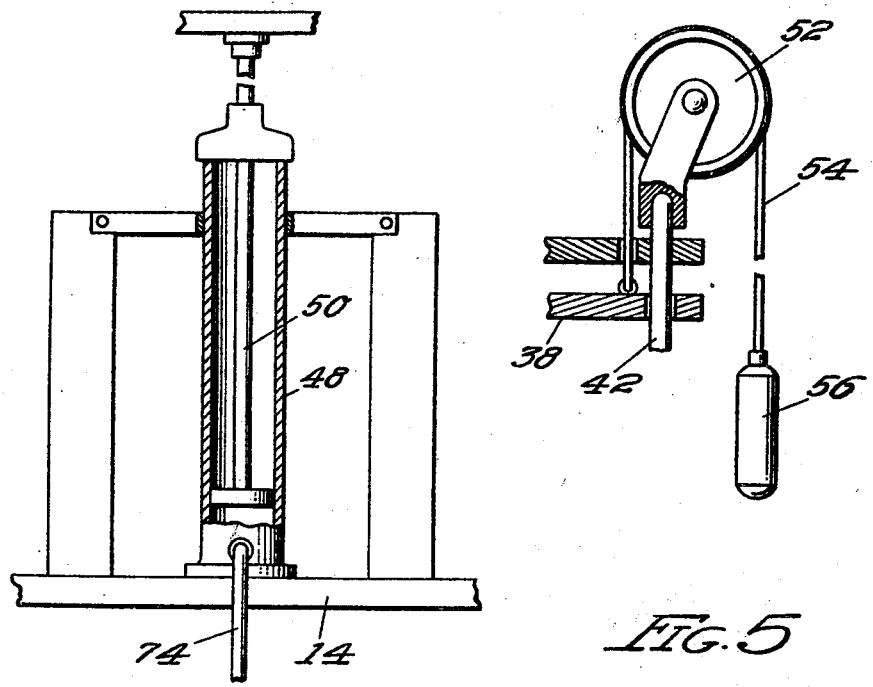
CHARLES V. BUDDENBROCK
INVENTOR
PER
Albert J Fike
ATTORNEY Patented Aug. 13, 1929.

1,724,449

UNITED STATES PATENT OFFICE.

CHARLES V. BUDDENBROCK, OF TRINIDAD, COLORADO.

SOIL-TREATING DEVICE.

Application filed April 9, 1928. Serial No. 268,512.

This invention relates to improvements in a soil treating device and has for one of its principal objects the provision of means for readily associating a heavy, barren, or dry hard soil with a lighter soil, a fertilizer or moisture, respectively, as the case may be.

In certain localities of the United States, especially in the Southwestern States, types of soils abound, commonly known as the adobe soils, which are of a heavy sticky quality. When fertilized and lightened these soils can be made very productive, but the problem to be met is not the obtaining of a fertilizer or lightening agent which would be most effective, but the greatest difficulty is that of efficiently intermixing and intimately associating the various improving elements with the soil.

One of the important objects of this invention is to provide means for drilling a number of holes in the soil, into which fertilizing and lightening agents can be inserted, thus effectively inoculating the barren soil and rendering it suitable for farming purposes.

It is also a well known fact that in these same Southwestern States the annual rainfall is comparatively small in comparison with other portions of the country. When the precious rain does fall in these above-mentioned adobe districts, the soil is so sunbaked and hard and is of such an oily quality that the moisture does not penetrate the soil but either remains on the surface and very quickly evaporates, leaving the under soil still dry and rock-like; or the accumulated water runs off in large streams, forming deep cuts or arroyos, which cause great damage.

Another important object of this invention is the provision of means for accumulating this moisture and transmitting it to the under surface of the soil where it will do most good. Holes can be bored in the soil, as mentioned above to preserve the water, or an absorbent material such as a fertilizer or the like can be inserted therein, thus utilizing all available moisture and at the same time nitrogenizing the under surface of the soil.

Other and further important objects of the invention will be apparent from the disclosures in the accompanying drawings and following specification.

The invention, in a preferred form, is illustrated in the drawings and hereinafter more fully described.

In the drawings:

Figure 3 is a partial detail view of the drill supporting frame and guides.

Figure 4 is a detail view of the pneumatic drill-frame hoist.

Figure 5 is a detail view of the drill-frame counter-weight mechanism.

Figure 6 illustrates a means for allowing slippage if a drill encounters rock or the like.

As shown in the drawings:

Figure 1:
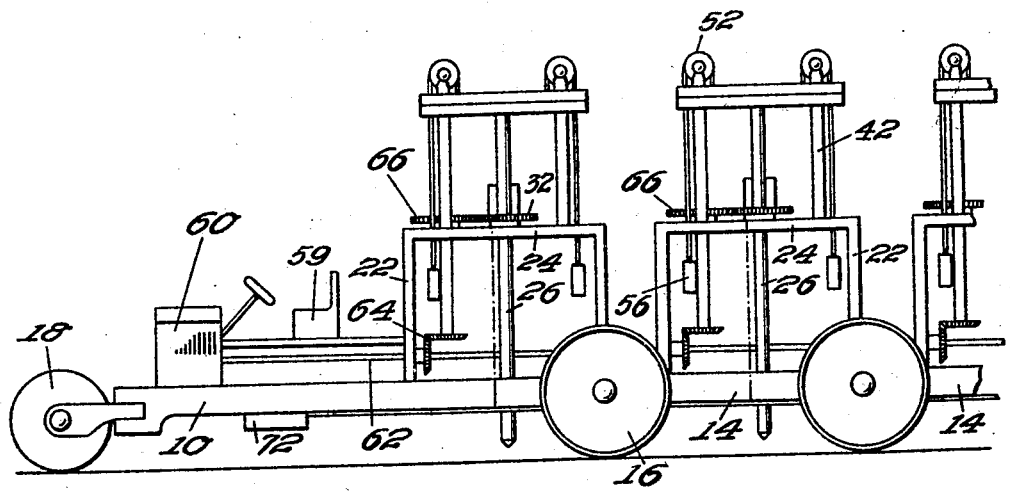
Figure 1 is a side elevation of the device, illustrating in particular the drill driving mechanism.

The reference numeral 10 indicates generally the frame or chassis of the device, made up of a front section 12 and a plurality of detachable sections 14. The front section is supported by a pair of running wheels 16 and a steering wheel 18. Each section 14 is provided with a pair of running wheels 16 similar to running wheels of the front section 12. The sections 14 are detachably connected to each other and to the front section 12 by means of coupling elements 20.

An upright structure 22 is mounted upon each of the sections 14 and upon the section 12, and covers substantially the length and width of the sections 14. Each structure 22 contains a plurality of cross members 24 in each of which a drill is rotatably and slidably journaled. The upper portion or shank 28 of each of the drills 26 is provided with a longitudinal slot 30 and loosely mounted upon the said shank is a sprocket wheel 32, the inner periphery of which is provided with a tongue adapted to fit into the slot 30, thereby rendering the sprocket wheel 32 slidable in a vertical direction with respect to the shank 28, but on rotation the wheel and shank move as a unit.

The upper end of the drill shank 28 is journaled in a frustro-conical block 34, ball bearings 36 being provided to reduce friction to a minimum. The block 34 is mounted in a cross member 38, the central portion of which is provided with an opening having sloping sides adapted to register with the periphery of the block 34, thus providing a frictional means for maintaining said block rigid with respect to the cross member 38. The block supporting cross members of each section 14 are all interconnected and form a rigid structure as at 39, thereby permitting all of the drills to descend simultaneously. It is apparent that if one of the drills encounters some hard substance such as rock or the like the downward travel of all the drills of that section will ordinarily be stopped. The frictionally mounted block 34 eliminates this undesirable feature, for if an abnormal upward thrust is imparted to any drill, the journal block will be forced from its housing in the member 38, thus permitting the remaining drills to continue their downward progress.

As shown in Figure 6, a clutch 80 can be inserted in each drill shank 28, allowing frictional slippage if the drill encounters some hard substance in its rotation.

In order to prevent any lateral motion of the drill in the upward and downward travel of the same, the cross member 38 is provided at each end with a sleeve 40 adapted to slide upon upstanding guides 42, and in order to limit the downward travel of the drill a pair of adjustable stops 44 are positioned on the guides at an optional point below the sleeves.

Downward motion of the drills is imparted by the weight of the drills themselves and the weight of the accompanying members 38 and 40, in addition, the helical character of the drill tends toward a downward travel when the drill is rotated. A scattering element 46 is adjustably positioned upon the drill 26 and is adapted to scatter the earth brought up by the drill. It is obvious that the member 46 is to be positioned upon the drill 26 relative to the positioning of the stops 44 upon the guides so that when the sleeves 40 come in contact with the stops, the lower portion of the member 46 will be substantially flush with the surface of the ground.

After the drills have been driven to their lowermost position they are hoisted to their uppermost position for a new operation by means of a plunger hoist comprising a cylinder 48, shown best in Figure 4. One hoist is provided for each section 14 and is suitably mounted in the center thereof. The upper end of the movable piston 50 of the hoist 48 is positioned beneath the framework of which the members 38 form a part and when air is admitted to the chamber of the hoist by a pipe 74 the drills are simultaneously lifted upwardly.

Pulleys 52 are mounted upon the upper ends of the four outer guides 42 of each section. A pulley rope 54 travels over each of these pulleys, one end of the rope being attached to the cross member 38 and the other end to a counterweight 56. By this means the hoist 48 can be materially assisted in lifting the drills, as it is apparent that not much weight is necessary to bore earth and the rotation of the helical drills is substantially sufficient to carry the drills downwardly.

Figure 2:
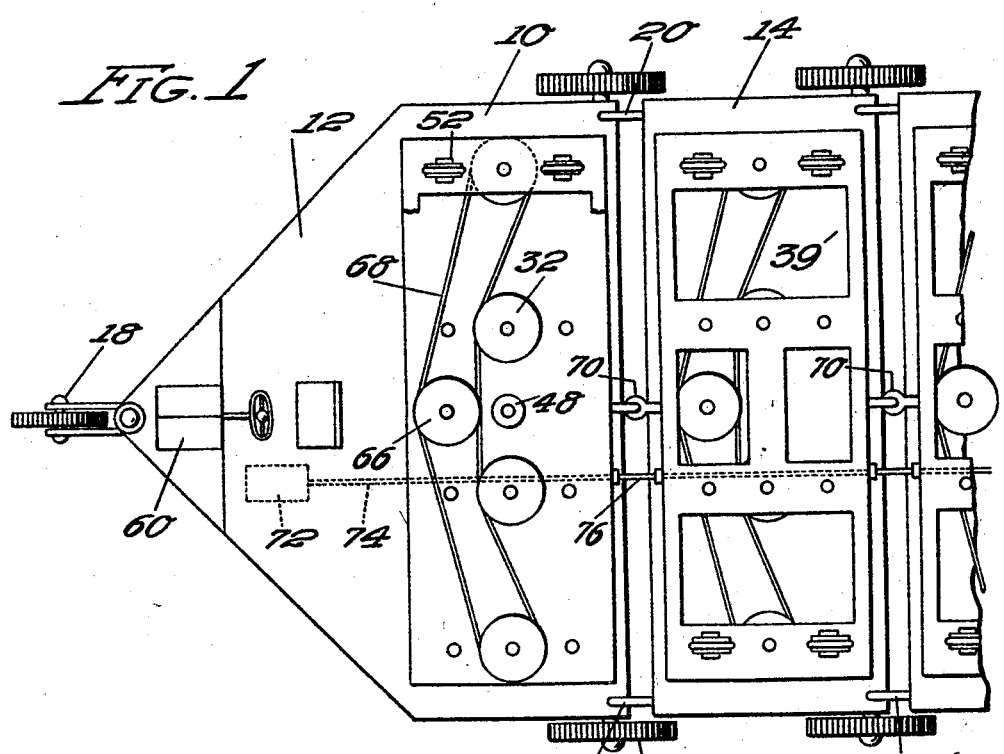
Figure 2 is a top plan view of the device as shown in Figure 1.

Mounted upon the front section 12 is a driver's seat 59 and immediately in front of the same is a motor or engine 60, which supplies the motive power for moving the device over the ground and also for driving the drills 26. A shaft 62 from the motor drives a series of bevel gears 64 which in turn drive a main sprocket wheel 66 on each section. A sprocket chain 68 then transmits motion of rotation to each of the drill sprocket wheels 32, one-half of the drills rotating in one direction and the other half rotating oppositely. The shaft 62 is constructed in sections depending in number upon the number of sections 14 to be added. Each shaft section is connected to the next succeeding shaft section by means of a universal joint 70, as shown best in Figure 2.

Positioned, also, upon the front section 12 is an air compressor 72 which can be driven by the engine 60 by suitable transmission means. A pipe line 74 leads from the compressor 72 to each of the hoists 48, connections being made between sections 14 by means of the couplings 76.

It is apparent that herein is provided a device which quickly and efficiently bores a plurality of holes in the ground for the insertion of fertilizer, soil lightening material and the like. A device which is extremely flexible in use, sections being quickly and conveniently added or detached, suiting itself to the acreage to be treated.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A soil treating device, including in combination, a plurality of sections, a drill supporting structure mounted on each section, a set of drills positioned in each structure, and means for simultaneously lowering each set of drills, said means comprising a pair of guides associated with each drill, a cross member operating on said guides, the upper end of each drill being journaled in its associated cross member, the cross members of each set being rigidly connected to each other.

2. A soil treating device, including in combination, a plurality of sections, a drill supporting structure mounted on each section, a set of drills positioned in each structure, and means for simultaneously lowering each set of drills, said means comprising a pair of guides associated with each drill, a cross member operating on said guides, the upper end of each drill being journaled in its associated cross member, the cross members of each set being rigidly connected to each other, and additional means for stopping the downward travel of one drill without stopping the downward travel of the other drills of the set.

3. A soil treating device, including in combination, a plurality of sections, a drill supporting structure mounted on each section, a set of drills positioned in each structure, and means for simultaneously lowering each set of drills, said means comprising a pair of guides associated with each drill, a cross member operating on said guides, the upper end of each drill being journaled in its associated cross member, the cross members of each set being rigidly connected to each other, and additional means for stopping the downward travel of one drill without stopping the downward travel of the other drills of the set, said additional means comprising a frustro-conical journal block mounted at the upper end of each drill, each cross member being provided with a frustro-conical opening for frictionally retaining said journal block.

4. A soil treating device including, in combination, a plurality of sections, a drill supporting structure mounted on each section, a set of drills positioned in each structure and means for simultaneously lowering and rotating the drills of each set, said means comprising a sprocket slidably but non-rotatably mounted on each drill shank.

In testimony whereof I affix my signature.

CHARLES V. BUDDENBROCK.